United States Patent
Ishizuka et al.

(10) Patent No.: US 6,766,640 B2
(45) Date of Patent: Jul. 27, 2004

(54) ENGINE EXHAUST PURIFICATION DEVICE

(75) Inventors: Yasuji Ishizuka, Chigasaki (JP);
Hideaki Takahashi, Yokohama (JP);
Yoshiaki Yoshioka, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/931,773

(22) Filed: Aug. 20, 2001

(65) Prior Publication Data

US 2002/0023432 A1 Feb. 28, 2002

(30) Foreign Application Priority Data

Aug. 30, 2000 (JP) ........................................ 2000-261241

(51) Int. Cl.$^7$ .............................................. F01N 3/00
(52) U.S. Cl. ............................ 60/285; 60/274; 60/286; 60/301
(58) Field of Search ......................... 60/274, 285, 286, 60/301

(56) References Cited

U.S. PATENT DOCUMENTS

| | | | | |
|---|---|---|---|---|
| 6,101,809 A | | 8/2000 | Ishizuka et al. ............... 60/276 |
| 6,134,882 A | * | 10/2000 | Huynh et al. ................. 60/274 |
| 6,185,929 B1 | * | 2/2001 | Ishizuka et al. ............... 60/277 |
| 6,216,448 B1 | * | 4/2001 | Schnaibel et al. ............. 60/277 |
| 6,216,449 B1 | * | 4/2001 | Strehlau et al. ............... 60/276 |
| 6,216,450 B1 | * | 4/2001 | Takahashi et al. ............. 60/276 |
| 6,216,451 B1 | * | 4/2001 | Schnaibel et al. ............. 60/277 |
| 6,233,923 B1 | * | 5/2001 | Itou et al. .................... 60/277 |
| 6,289,672 B1 | * | 9/2001 | Katoh et al. .................. 60/277 |
| 6,289,673 B1 | | 9/2001 | Tayama et al. |
| 6,308,697 B1 | * | 10/2001 | Surnilla et al. ............... 60/276 |
| 6,327,847 B1 | * | 12/2001 | Surnilla et al. ............... 60/277 |
| 6,336,320 B1 | * | 1/2002 | Tanaka et al. ................ 60/285 |
| 6,418,711 B1 | * | 7/2002 | Surnilla et al. ............... 60/277 |
| 6,427,437 B1 | * | 8/2002 | Bidner et al. ................. 60/274 |

FOREIGN PATENT DOCUMENTS

| | | |
|---|---|---|
| EP | 0 965 734 A2 | 12/1999 |
| EP | 0 997 617 A1 | 5/2000 |
| JP | 2000-054824 | 2/2000 |
| JP | 2000-120475 | 4/2000 |
| JP | 02001227331 | * 8/2001 |

* cited by examiner

Primary Examiner—Thomas Denion
(74) Attorney, Agent, or Firm—Foley & Lardner LLP

(57) ABSTRACT

A first catalyst 21 which stores or releases oxygen according to an air-fuel ratio, and a second catalyst 22 which traps or releases NOx according to the air-fuel ratio, are provided in an exhaust passage 9 of an engine 1. A controller 6 temporarily shifts the air-fuel ratio of the engine 1 to rich when it is determined that the NOx trap catalyst second catalyst 22 is released. At this time, the controller 6 increases a reducing agent supply amount due to the rich shift to be larger, the larger the oxygen amount stored by the two catalysts 21, 22. In this way, the air-fuel ratio in the second catalyst 22 is maintained at a target stoichiometric or rich air-fuel ratio.

23 Claims, 10 Drawing Sheets

| ENGINE LOAD | | | | |
|---|---|---|---|---|
| LARGE | - | - | - | - |
| | - | - | - | - |
| | 350 | - | - | - |
| | 300 | - | - | - |
| SMALL | 200 | 250 | - | - |
| | LOW ENGINE ROTATION SPEED | | | HIGH |

*FIG. 4*

ENGINE EXHAUST PURIFICATION DEVICE

FIELD OF THE INVENTION

This invention relates to an engine exhaust purification device comprising a NOx trap catalyst.

BACKGROUND OF THE INVENTION

JP-A-2000-54824 published by the Japanese Patent Office in 2000 discloses an engine wherein NOx (nitrogen oxides) in exhaust gas are trapped by the NOx trap catalyst when the air-fuel ratio in the catalyst is lean, and the trapped NOx is released from the NOx trap catalyst when the air-fuel ratio in the catalyst is the stoichiometric air-fuel ratio or a rich air-fuel ratio.

In an engine provided with this type of NOx trap catalyst, NOx discharged from the engine while the engine is running under a lean air-fuel ratio is trapped by the NOx trap catalyst so that discharge of NOx into the atmosphere is prevented. However, the NOx amount which can be trapped by the NOx trap catalyst is limited, and as the NOx trap rate decreases when the NOx amount increases, it is necessary to release and reduce NOx when the NOx trap amount increases.

Hence in general, when the trapped NOx amount increases, the fuel ratio of the engine is shifted to rich and the air-fuel ratio in the catalyst is controlled to stoichiometric or rich, and the NOx trapped in the NOx trap catalyst is released and reduced, for a predetermined time.

SUMMARY OF THE INVENTION

As described above, when NOx in the NOx trap catalyst is released and reduced, the air-fuel ratio of the engine may be shifted to rich, and a reducing agent may be supplied to the NOx trap catalyst.

However, if the amount of reducing agent supplied is small relative to the oxygen amount stored by the catalyst, the trapped NOx cannot be fully released and reduced. This is because even if the air-fuel ratio of the engine is shifted to rich, the air-fuel ratio in catalyst returns to lean to some extent due to the oxygen released from the catalyst, and the atmosphere in the catalyst shifts from the target stoichiometric air-fuel ratio or rich air-fuel ratio.

Conversely, if the amount of reducing agent supplied is large relative to the oxygen amount stored by the catalyst, the air-fuel ratio in the catalyst becomes richer than necessary, and the amount of CO and HC (hydrocarbons) discharged into the atmosphere increases.

It is therefore an object of this invention to release and reduce NOx with high efficiency by supplying a reducing agent which is neither in excess or deficiency when NOx trapped in the catalyst is released and reduced, and to prevent increase of CO and HC discharged into the atmosphere.

In order to achieve above object, this invention provides an exhaust gas purification device for an engine, comprising an exhaust passage of the engine, a first catalyst, installed in the exhaust passage, that stores and releases oxygen in exhaust gas in accordance with an air-fuel ratio of exhaust gas, a second catalyst, installed in the exhaust passage downstream of the first catalyst, that traps and releases NOx in exhaust gas in accordance with the air-fuel ratio of exhaust gas, and a microprocessor programmed to perform a rich operation that controls the air-fuel ratio of exhaust gas to rich when trapped NOx in the second catalyst is to be released, wherein an amount of reducing agent in exhaust gas due to the rich operation is increased with increase in a total oxygen amount stored in the first catalyst and the second catalyst.

According to an aspect of this invention, this invention provides a method for purifying exhaust gas discharged from an engine, comprising computing a total oxygen amount stored in a first catalyst and a second catalyst based on an engine operation condition, wherein the second catalyst being disposed downstream of the first catalyst, performing a rich operation that controls the air-fuel ratio of exhaust gas to rich when trapped NOx in the second catalyst is to be released, wherein an amount of reducing agent in exhaust gas due to the rich operation is increased with increase in a total oxygen amount stored in the first catalyst and the second catalyst.

The details as well as other features and advantages of this invention are set forth in the remainder of the specification and are shown in the accompanying drawings.

BRIEF DESCRIPTION OF THE DRAWINGS

FIG. 4 is a map for computing NOx concentration.

DESCRIPTION OF THE PREFERRED EMBODIMENTS

Figure 1:
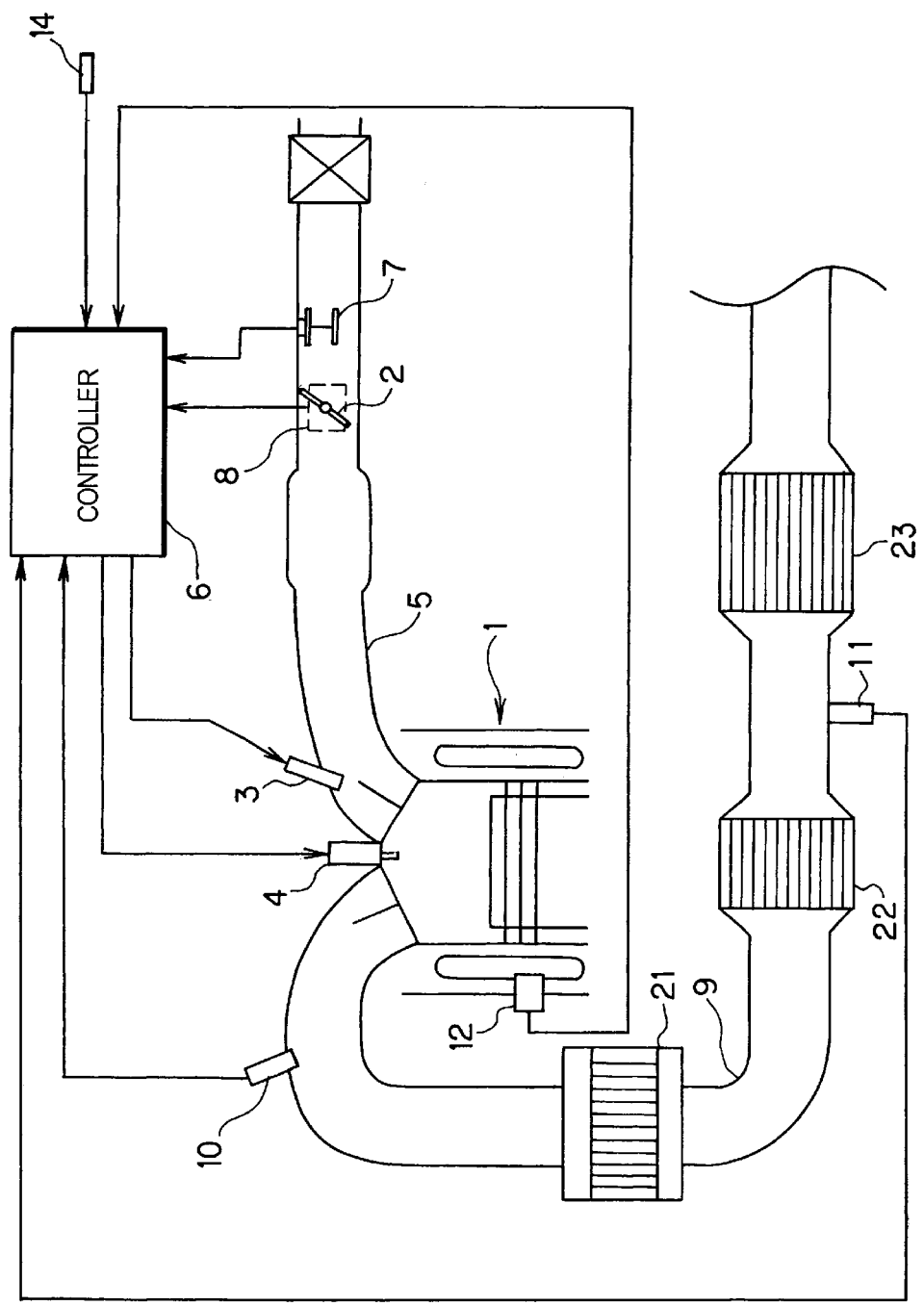
FIG. 1 is a schematic view of an exhaust gas purification device according to this invention.

Referring to FIG. 1 of the drawings, a throttle 2 is interposed in an intake air passage 5 of an engine 1, air adjusted by the throttle 2 being aspirated into the engine 1. This aspirated air is mixed with fuel injected by an injector 3 to form an air-fuel mixture. The injector 3 may inject the fuel into an intake port or may directly inject fuel into a combustion chamber of the engine 1.

The air-fuel mixture in the combustion chamber is ignited by a spark plug 4 and burnt. The exhaust gas is purified by a first catalyst 21, second catalyst 22 and third catalyst 23 provided in an exhaust passage 9, and discharged into the atmosphere.

The first catalyst 21 is a three-way catalyst which removes HC, CO discharged from the engine 1 when the engine starts up, and improves the exhaust gas purification performance. The first catalyst 21 is provided in the vicinity of the engine 1 so that it can rapidly attain an activation temperature.

The second catalyst 22 is a NOx trap catalyst which traps NOx in the exhaust gas when the air-fuel ratio in the catalyst 22 is lean, and releases the trapped NOx when the air-fuel ratio in the catalyst 22 is the stoichiometric air-fuel ratio or a rich air-fuel ratio, and reduces the NOx in a three-way catalyst layer. Here, the expression "the air-fuel ratio is lean" means that the air-fuel ratio is larger than the stoichiometric air-fuel ratio, and the expression "the air-fuel ratio is rich" means that the air-fuel ratio is smaller than the stoichiometric air-fuel ratio.

When the air-fuel ratio in the catalyst is lean, the first catalyst 21 and second catalyst 22 store oxygen, and when it is stoichiometric or rich, they release the stored oxygen.

The third catalyst 23 installed downstream of the NOx trap catalyst 22 is a three-way catalyst. The third catalyst 23 is used as a backup when NOx from the NOx trap catalyst 22 is released and reduced.

A controller 6 which controls the injection timing and injection amount of the injector 3 and the ignition timing of the spark plug 4 comprises a microprocessor, memory and input/output interface. The controller 6 performs computation processing based on signals from sensors used for detecting running conditions described later, outputs a fuel injection signal (injection pulse signal) and injection timing to the injector 3, and outputs an ignition signal to the spark plug 4.

During the computation of the fuel injection signal, a target air-fuel ratio is determined according to the running conditions, and a fuel injection amount (injection pulse width) is computed to give an air-fuel mixture having the target air-fuel ratio. Under low speed, low load conditions, the target air-fuel ratio is set to be leaner than the stoichiometric air-fuel ratio.

The sensors which detect running conditions comprise an air flow meter 7 which detects the intake air flowrate of the engine 1, a throttle opening sensor 8 which detects the opening of the throttle 2, a first air-fuel ratio sensor 10 which is installed upstream of the first catalyst 21 and detects the exhaust gas air-fuel ratio, a second air-fuel ratio sensor 11 installed between the NOx trap catalyst 22 and third catalyst 23 which detects the exhaust gas air-fuel ratio, a crank angle sensor 14 which detects a rotation speed of the engine 1 and a water temperature sensor 12 which detects the cooling water temperature of the engine 1.

The air-fuel ratio sensors 10, 11 are sensors which detect the exhaust gas air-fuel ratio based on the oxygen concentration in the exhaust gas. The air-fuel ratio sensors 10, 11 may be stoichiometric sensors which detect only the stoichiometric air-fuel ratio, or universal air-fuel ratio sensors which can detect the exhaust gas air-fuel ratio over a wide range.

The controller 6 normally sets an air-fuel ratio feedback correction coefficient $\alpha$ by, for example, proportional/integral control so that the exhaust gas air-fuel ratio detected that the first air-fuel ratio sensor 10 approaches the target air-fuel ratio.

The NOx in the exhaust gas when the engine 1 is running under a lean air-fuel ratio or when lean exhaust gas is discharged due to fuel cut, etc., is trapped by the NOx trap catalyst 22.

The NOx amount which can be trapped by the NOx trap catalyst 22 is limited. The NOx trap rate decreases the more the trapped NOx amount increases, so when the trapped NOx amount increases to some extent, the air-fuel ratio in the catalyst is controlled to stoichiometric or rich, and the trapped NOx is released and reduced.

However, in this case, even if control is performed so that the exhaust gas air-fuel ratio detected by the first air-fuel ratio sensor 10 approaches the target air-fuel ratio in the catalyst, the oxygen stored in the catalysts 21, 22 is released and the air-fuel ratio in the NOx trap catalyst 22 shifts to become leaner than the target air-fuel ratio in the catalyst, so NOx cannot be adequately released and reduced.

Further, even if the exhaust gas air-fuel ratio detected by the second air-fuel ratio sensor 11 is controlled to approach the target air-fuel ratio in the catalyst, the oxygen stored in the NOx trap catalyst 22 is released, so the atmosphere in the NOx trap catalyst 22 cannot be made to coincide with the target air-fuel ratio in the catalyst.

Thus, according to this embodiment, when the target air-fuel ratio of the engine 1 is temporarily shifted to rich, by determining the amount of reducing agent supplied due to this rich shift according to the oxygen amount stored in the catalysts 21, 22, the trapped NOx can be sufficiently released and reduced. Further, the oxygen amount stored by the catalysts 21, 22 is computed to high precision taking account of the conditions prior to NOx release/reduction processing.

Figure 2:
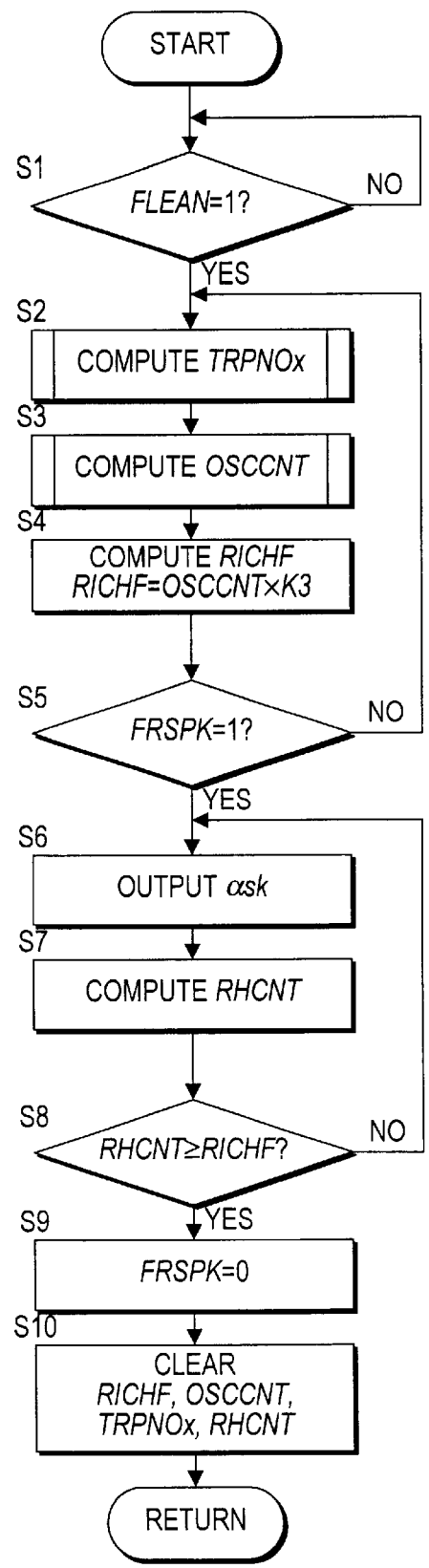
FIG. 2 is a flowchart showing the details of NOx release/reduction processing.

FIG. 2 is a flowchart showing the details of NOx release/reduction processing performed by the controller 6.

Describing this flowchart, first, in a step S1, the generation of lean exhaust gas is determined by determining whether or not a flag FLEAN indicating lean running conditions is "1". The flag FLEAN is set to "1" when, for example, the output of the first air-fuel ratio sensor 10 has become leaner than the stoichiometric air-fuel ratio. When the flag FLEAN is "1", the routine proceeds to a step S2, and a NOx amount TRPNOx trapped by the NOx trap catalyst 22 is computed.

Figure 3:
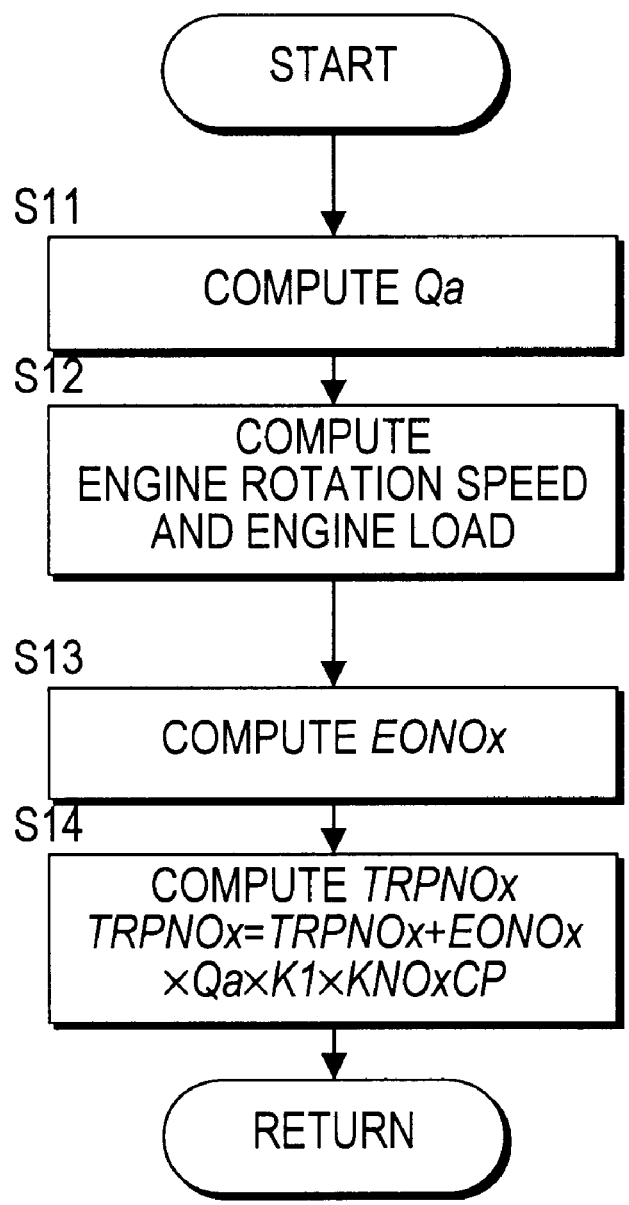
FIG. 3 is a flowchart showing the details of a NOx trap amount computation processing.

The computation of the NOx amount TRPNOx is performed according to the flowchart shown in FIG. 3. In the computation of the NOx amount TRPNOx, first, an intake air amount Qa is computed based on the output of the air flow meter 7 (step S11), and the engine rotation speed and engine load are computed based on the output of the crank angle sensor 14 and throttle opening sensor 8 (step S12). A NOx concentration EONOx in the engine exhaust gas is then computed, for example by looking up a map shown in FIG. 4, based on the computed engine rotation speed and load (step S13).

In the step S14, the present trapped NOx amount TRPNOx is computed by the equation:

$$TRPNOx = TRPNOx + EONOx \times Qa \times K1 \times KNOxCP$$

K1 is a conversion constant and KNOxCP is a NOx trap rate which varies according to the conditions such as catalyst temperature, catalyst deterioration and present trapped NOx amount.

Figure 5:
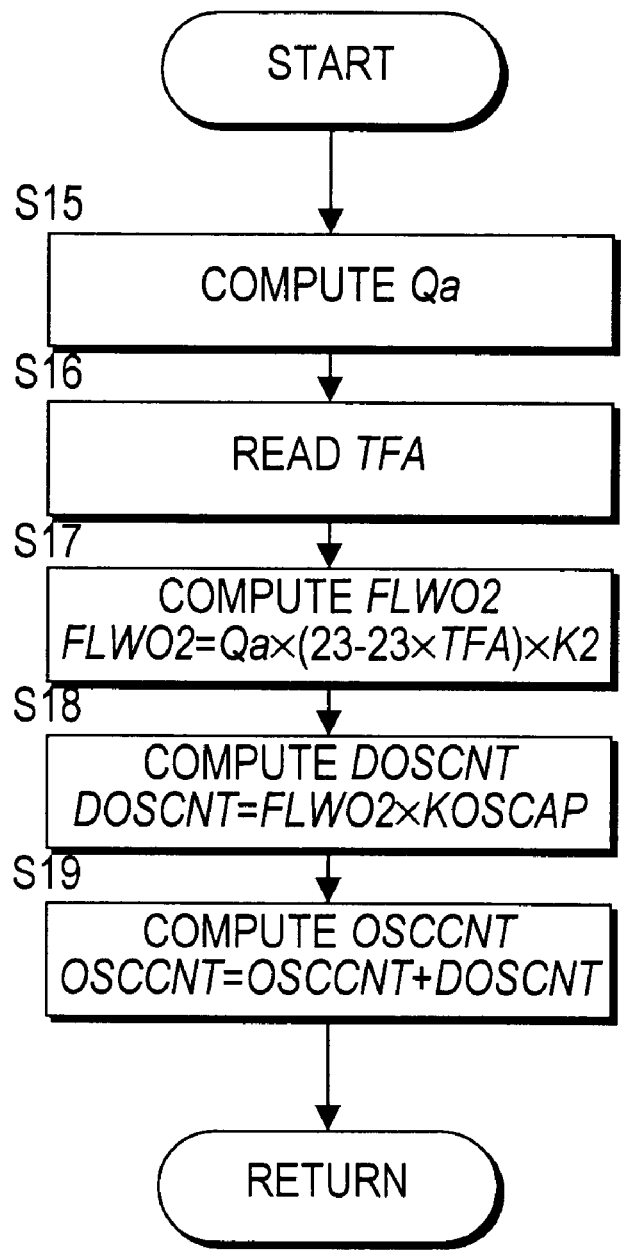
FIG. 5 is a flowchart showing the details of an oxygen storage amount computation.

Returning to FIG. 2, in a step S3, the computation of an oxygen amount OSCCNT stored in the catalysts 21, 22 is performed. The computation of the oxygen storage amount OSCCNT is performed according to the flowchart shown in FIG. 5. According to this, first, the intake air amount Qa is computed based on the output of the air flow meter 7 (step S15), and a present air-fuel ratio TFA of the engine 1 is read (step S16). The air-fuel ratio may be a value directly detected by the air-fuel ratio sensor 10, or it may be a target air-fuel ratio of the engine 1 computed by the controller 6.

In a step S17, an oxygen amount FLWO2 flowing into the catalysts 21, 22 is calculated. The inflowing oxygen amount FLWO2 is calculated based on the intake air amount Qa, air-fuel ratio TFA and a conversion constant K2 by the following equation:

$$FLWO2 = Qa \times (23 - 23 \times TFA) \times K2$$

In a step S18, an oxygen amount DOSCNT newly stored by the catalyst 21, 22 (=variation amount of total oxygen stored amount) is computed. Here, the variation amount DOSCNT is computed by multiplying the oxygen amount flowing into the catalysts 21, 22 by a storage rate KOSCAP in the catalysts 21, 22.

$$DOSCNT = FLWO2 \times KOSCAP$$

The storage rate is a ratio between the oxygen amount newly stored by the catalyst to the oxygen amount flowing into the catalyst.

Figure 6:
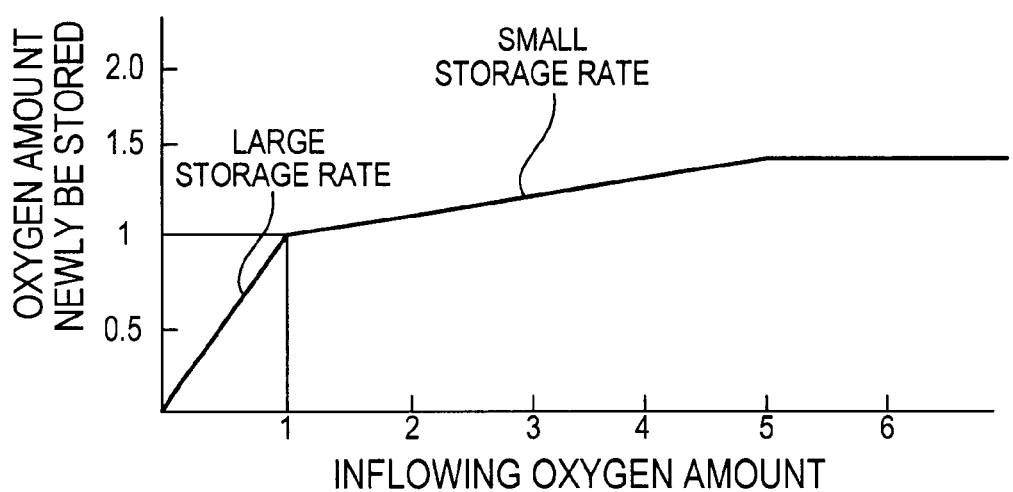
FIG. 6 is a drawing showing the characteristics of an oxygen storage rate.

The oxygen storage rate KOSCAP of the catalysts 21, 22 has the characteristics shown in FIG. 6 according to the oxygen amount which is already stored when lean running begins. The storage rate is represented by the gradient of the characteristic curve shown in FIG. 6. Up to a certain oxygen storage amount, the oxygen storage rate is high relative to the inflowing oxygen amount, then it falls to a low value. It becomes effectively zero at a certain storage amount. These characteristics may also be corrected for various conditions such as catalyst temperature and deterioration. For example, when the catalyst temperature is low and the catalyst has not yet been activated, or when the catalyst has deteriorated, the storage rate is corrected to the low side.

In the actual computation, the computation is performed separately for a region with a high storage rate and a region with a low storage rate according to the oxygen storage amount. When the oxygen storage amount is less than a predetermined value O2RPD, the storage rate KOSCAP is set to TRK1, and when it is equal to or greater than the predetermined value O2RPD, the storage rate KOSCAP is set to TRK2 (<TRK1). Hence by separating these two regions, the storage rate can be precisely approximated, and the oxygen storage amount of can be calculated with high precision.

After the variation amount DOSCNT of the oxygen storage amount has been computed in this way, the value obtained by adding the variation amount DOSCNT of the oxygen storage amount to the oxygen storage amount OSC-CNT on the immediately preceding occasion the computation was performed, is set as the new oxygen storage amount OSCCNT (step S19).

$$OSCCNT=OSCCNT+DOSCNT$$

Returning to FIG. 2, in a step S4, in order to supply a reducing agent amount according to the total oxygen amount OSCCNT stored by the catalysts 21, 22, a required reducing agent amount RICHF is computed by multiplying the oxygen storage amount OSCCNT by a constant K3.

$$RICHF=OSCCNT \times K3$$

In a step S5, it is determined whether or not rich shift start conditions are satisfied, based on a flag FRSPK. Here, when lean running prohibition conditions are satisfied or the NOx amount (TRPNOx) trapped by the catalyst 22 has reached a certain value, the flag FRSPK is set to "1". When the rich shift start conditions are satisfied, the routine proceeds to a step S6.

In the step S6, the air-fuel ratio correction coefficient is set to αsk, and the air-fuel ratio is shifted to rich. In a step S7, a reducing agent amount RHCNT supplied until the present time from when rich shift started is computed from the following equation:

$$RHCNT=RHCNT+Qa \times \alpha sk \times K5$$

K5 is a constant.

In a step S8, the reducing agent amount RHCNT supplied until the present time is compared with the required reducing agent amount RICHF. When the supplied reducing agent amount RHCNT has still not reached the required reducing agent amount RICHF, the air-fuel ratio correction coefficient is left at αsk. When the supplied reducing agent amount RHCNT has reached the required reducing agent amount RICHF, the routine proceeds to a step S9, rich shift is terminated and the flag FRSPK is set to zero.

In a step S10, the counters (RICHF, OSCCNT, TRPNOx, RHCNT) are cleared, and the routine returns to ordinary air-fuel ratio control.

Therefore, according to the above processing, as the oxygen storage amount of the catalysts 21, 22 is computed separately for a region having a high oxygen storage rate and a region having a low oxygen storage rate (step S18) based on the characteristics wherein the oxygen storage rate varies according to the oxygen storage amount, the oxygen storage amount can be estimated with high precision even if the air-fuel ratio during lean running or lean running time is different.

During NOx release/purification processing, the NOx amount released from the catalyst 22 is affected by the oxygen amount stored in the catalysts 21, 22, but as a reducing agent amount corresponding to this oxygen storage amount is supplied (step S4, S6 through S8), the NOx trap catalyst 22 is maintained at the target air-fuel ratio, for example stoichiometric or a rich air-fuel ratio, and the trapped NOx can be released satisfactorily. Further, the supplied HC, CO are used for purifying the released NOx, so the discharge amounts of HC, CO into the atmosphere are suppressed to the absolute minimum.

In the above processing, the required reducing agent amount RICHF was set to a value according to the oxygen storage amount of the catalysts 21, 22 (step S4), but as the reducing agent amount required to purify NOx becomes large even if the trapped NOx amount becomes large, the reducing agent supply amount may be computed taking account also of the trapped NOx amount TRPNOx in the catalyst 22. In this case, the required reducing agent amount RICHF computed in the step S4 may be a value obtained by adding a value obtained by multiplying the NOx amount TRPNOx by the constant K4, to a value obtained by multiplying the oxygen storage amount OSCCNT by the constant K3.

$$RICHF=OSCCNT \times K3+TRPNOx \times K4$$

Next, a second embodiment will be described.

In this embodiment, the method of computing the oxygen storage amount OSCCNT of the catalysts 21, 22 is different from that of the preceding embodiment. Specifically, the oxygen amount stored by the catalysts 21, 22 may be separated into a high speed component stored/released by a noble metal (Pt, Rh, Pd) in the catalysts and a low speed component stored/released by an oxygen storage material in the catalyst. The oxygen storage amount is computed based on the fact that although the low speed component stores/releases a large amount of oxygen compared to the high speed component, its storage/release rate is slower than that of the high speed component.

The computation is performed for the high speed component and low speed component assuming that, when oxygen is stored during lean running, first, oxygen is stored as the high speed component, and oxygen then begins to be stored as the low speed component when the high speed component reaches maximum capacity and oxygen can no longer be stored as the high speed component. The oxygen storage amount is calculated as the sum of this high speed component and low speed component.

Figure 7:
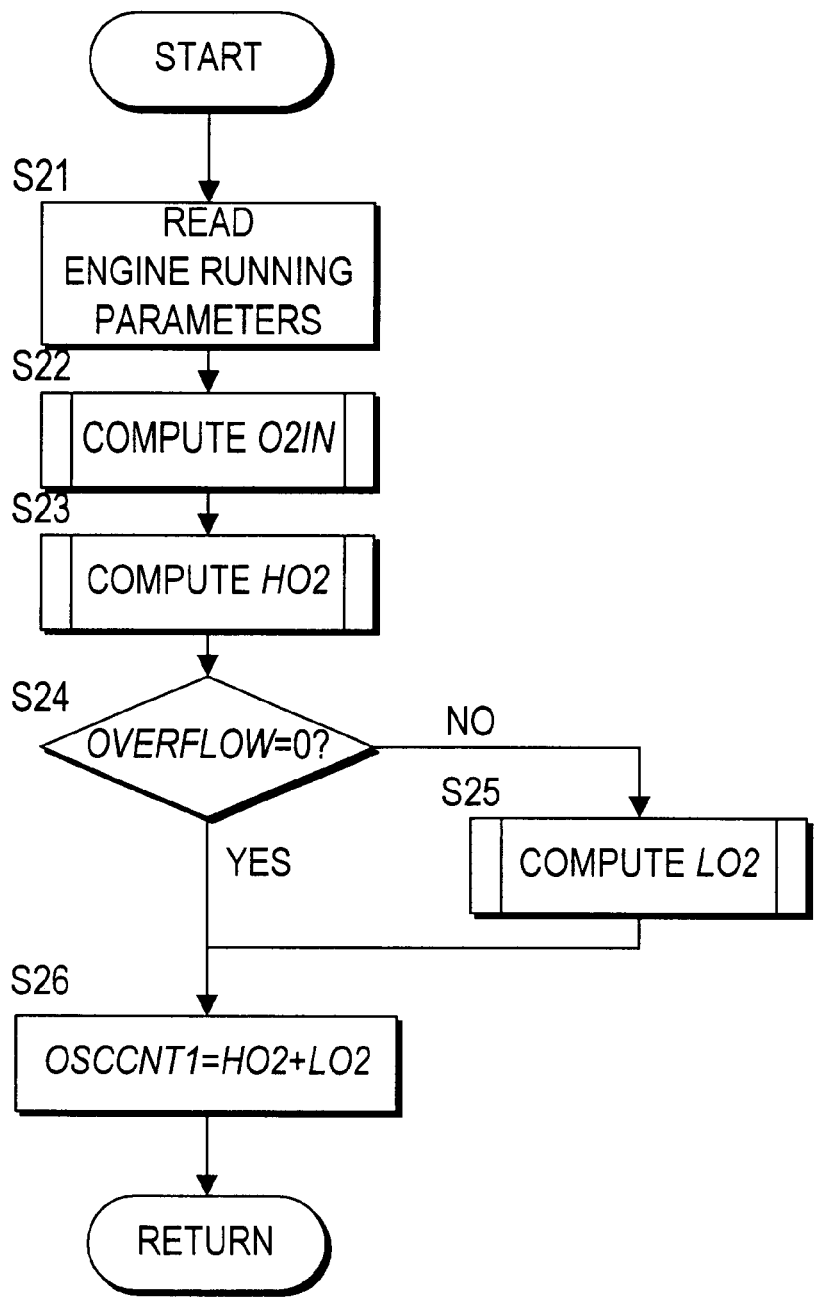
FIG. 7 is a flowchart showing the details of another example of an oxygen storage amount computation processing (second embodiment).

FIG. 7 shows the details of a main routine for computing an oxygen storage amount OSCCNT1 of the catalysts 21. This may be performed by the controller 6 instead of the computation routine shown in FIG. 5.

First, in a step S21, various running parameters of the engine 1 are read, i.e., the output of the cooling water temperature sensor 12, crank angle sensor 14 and air flow meter 7.

In a step S22, a subroutine (FIG. 8) for computing an excess oxygen amount O2IN, described later, is performed to compute the excess oxygen amount O2IN in the exhaust gas flowing into the catalyst 21. In a step S23, a subroutine (FIG. 9) for computing a high speed component HO2, described later, is performed, and the high speed component HO2 and an overflow part OVERFLOW not stored as the high speed component HO2 are computed based on the excess oxygen amount O2IN.

In a step S24, it is determined whether or not the excess oxygen amount O2IN in exhaust gas flowing into the catalyst 21 was completely stored as the high speed component HO2 based on the overflow part OVERFLOW computed in the step S23. When the excess oxygen amount O2IN was completely stored as the high speed component (OVERFLOW=0), the routine proceeds to a step S26, otherwise the routine proceeds to a step S25 and a subroutine (FIG. 10) for computing a low speed component LO2, described later, is performed.

In the step S26, the high speed component HO2 and low speed component LO2 computed as described above are added, and the oxygen storage amount OSCCNT1 of the catalyst 21 is thereby computed.

Figure 8:
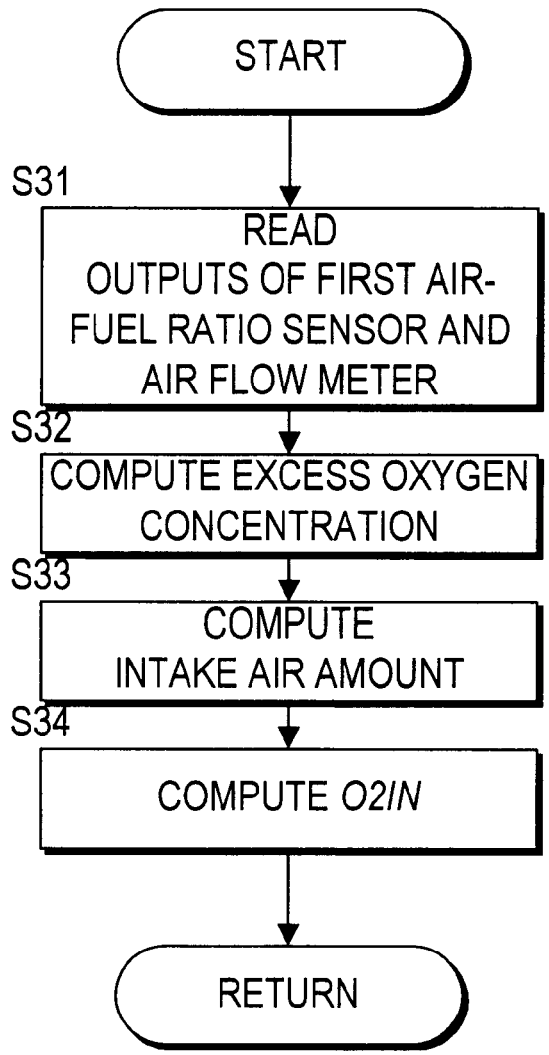
FIG. 8 is a flowchart showing the details of an excess oxygen amount computation processing.

FIG. 8 shows the subroutine for computing the excess oxygen amount O2IN in the exhaust gas flowing into the catalyst 21. In this subroutine, the excess amount O2IN in the exhaust gas flowing into the catalyst 21 is computed based on the air-fuel ratio upstream of the catalyst 21 and the intake air amount of the engine 1.

First, in a step S31, the outputs of the first air-fuel ratio sensor 10 and air flow meter 7 are read. In a step S32, the output of the first air-fuel ratio sensor 10 is converted to an air-fuel ratio using a predetermined conversion table, and the excess oxygen concentration in the exhaust gas flowing into the catalyst 21 is computed. Here, the excess oxygen concentration is a relative concentration based on the oxygen concentration at the stoichiometric air-fuel ratio. When the exhaust gas is at the stoichiometric air-fuel ratio, it is zero, when the exhaust gas is rich, it is a negative value, and when the exhaust gas is lean, it is a positive value.

In a step S33, the output of the air flow meter 7 is converted to an intake air amount using a predetermined conversion table, and in a step S34, the excess oxygen amount O2IN in the exhaust gas flowing into the catalyst 21 is computed by multiplying the intake air amount computed in the step S33 by the excess oxygen concentration computed in the step S32. As the excess oxygen concentration has the above characteristics, the excess oxygen amount O2IN is zero when the exhaust gas flowing into the catalyst 21 is at the stoichiometric air-fuel ratio, a negative value when it is rich, and a positive value when it is lean.

Figure 9:
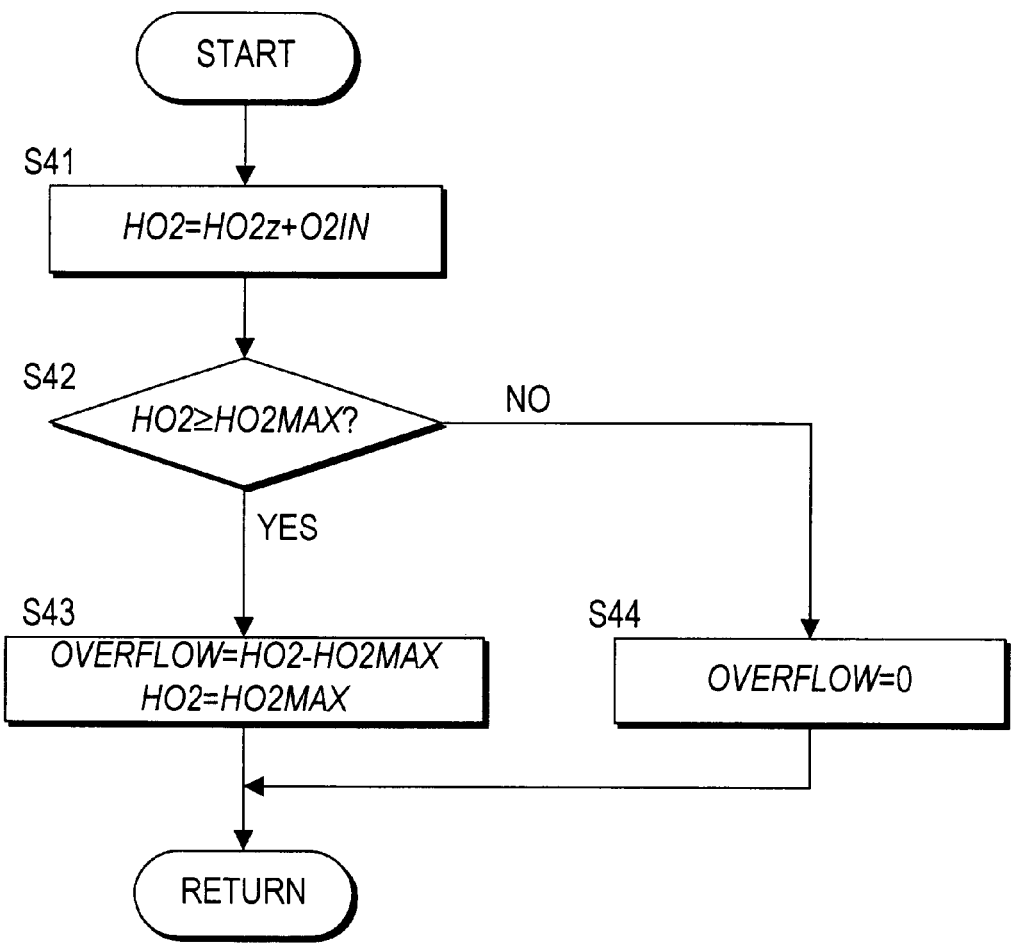
FIG. 9 is a flowchart showing the details of a high-speed component computation processing.

FIG. 9 shows a subroutine for computing the high speed component HO2. In this subroutine, the computation of the high speed component HO2 is performed based on the excess oxygen amount O2IN of the exhaust gas flowing into the catalyst 21.

According to this, first, in a step S41, the high speed component HO2 is computed from the following equation:

$$HO2=HO2z+O2IN$$

where, HO2z=immediately preceding value of high speed component HO2.

In a step S42, it is determined whether or not this value exceeds a maximum capacity HO2MAX of the high speed component. When the high speed component HO2 is equal to or greater than the maximum capacity HO2MAX, the routine proceeds to a step S43, the overflow part (excess amount) OVERFLOW which could not be stored as the high speed component HO2 is computed by the following equation:

$$OVERFLOW=HO2-HO2MAX$$

and the high speed component HO2 is limited to the maximum capacity HO2MAX. When the high speed component HO2 is greater than the maximum capacity HO2MAX, the overflow part OVERFLOW which could not be stored as the high speed component HO2, is stored as the low speed component LO2.

On the other hand, when the high speed component HO2 is less than the maximum capacity HO2MAX, the oxygen excess/deficiency amount O2IN flowing into the catalyst 21 is completely stored as the high speed component HO2, so the routine proceeds to a step S44 and the overflow part OVERFLOW is set to zero.

Figure 10:
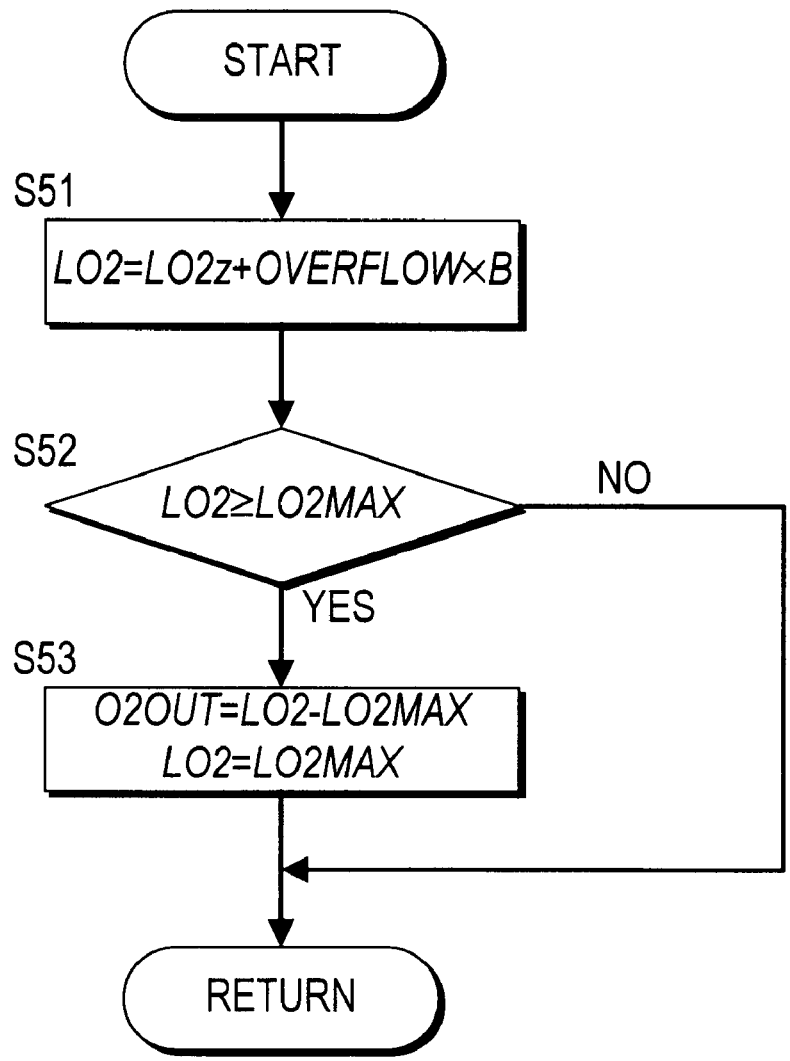
FIG. 10 is a flowchart showing the details of a low speed component computation processing.

FIG. 10 shows a subroutine for computing the low speed component LO2. In this subroutine, the low speed component LO2 is computed based on the overflow part OVERFLOW which overflowed from the high speed component HO2.

According to this, in a step S51, the low speed component LO2 is computed by the following equation:

$$LO2=LO2z+OVERFLOW \times B$$

where, LO2z=immediately preceding value of low speed component LO2, and

B=oxygen storage/release rate of low speed component.

The oxygen storage/release rate B of the low speed component is set to a positive value less than 1.

The oxygen storage/release rate B actually has different characteristics for storage and release, and as the real storage/release rate is affected by the catalyst temperature and low speed component LO2, etc., the storage rate and release rate may be set independently and variably. In this case, when the overflow part OVERFLOW is positive, oxygen is in excess. The oxygen storage rate B is then for example set to a larger value the higher the catalyst temperature or the smaller the low speed component LO2.

In a step S52, as in the case of the computation of the high speed component HO2, it is determined whether or not the computed low speed component LO2 exceeds its maximum capacity LO2MAX. When it exceeds the maximum capacity LO2MAX, the routine proceeds to a step S53, and the low speed component LO2 is limited to the maximum capacity LO2MAX. An oxygen excess/deficiency amount O2OUT overflowing from the low speed component LO2 is then computed by the following equation:

$$O2OUT=LO2-LO2MAX$$

This oxygen excess/deficiency amount flows out to the downstream catalyst 22.

When the oxygen storage amount OSCCNT1 of the catalyst 21 has been computed in this way, and oxygen storage amount OSCCNT2 of the catalyst 22 is likewise computed separately for the high speed component HO2 low speed component (flowchart omitted), and the sum of the oxygen storage amount OSCCNT1 of the catalyst 21 and oxygen storage amount OSCCNT2 of the catalyst 22 is set to the oxygen storage amount OSCCNT. Here, regarding the excess oxygen amount O2IN in the exhaust gas flowing into the catalyst 22, the oxygen storage amount OSCCNT2 of the catalyst 22 can be calculated using the oxygen excess/deficiency amount O2OUT calculated in the step S53 of FIG. 10.

Therefore, according to this embodiment, the oxygen storage amount OSCCNT is computed separately as the high speed component HO2 and low speed component LO2 in line with actual characteristics, so the oxygen amount OSCCNT stored by the catalysts 21, 22 can be computed with even higher precision. In this way, the required reducing agent according to the oxygen storage amount can be supplied more precisely, NOx trapped by the NOx trap catalyst can be released/reduced efficiently, and increase of CO, HC which are discharged into the atmosphere can be prevented.

The methods of computing the trapped NOx amount and oxygen storage amount are not limited to those described here, and other methods may be used. Also, the construction of the exhaust gas purification device is not limited to that shown in FIG. 1, and may comprise a NOx trap catalyst together with a catalyst for storing oxygen which is installed upstream.

In the first embodiment, the oxygen storage amount was computed for the catalysts 21, 22 together, but the oxygen storage amount may be computed separately for the catalyst 21 and catalyst 22. If the computation is performed separately, the precision of computing the oxygen storage amount is further improved, and the reducing agent required for release/reduction of NOx can be supplied with even less excess/deficiency.

The entire contents of Japanese Patent Application P2000-261241 (filed Aug. 30, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed:

1. An exhaust gas purification device for an engine, comprising:

an exhaust passage of the engine;

a first catalyst, installed in the exhaust passage, that stores and releases oxygen in exhaust gas in accordance with an air-fuel ratio of exhaust gas;

a second catalyst, installed in the exhaust passage downstream of the first catalyst, that traps and releases NOx in exhaust gas in accordance with the air-fuel ratio of exhaust gas; and a microprocessor programmed to:

compute a total oxygen amount stored in the first catalyst and the second catalyst, compute a required reducing agent amount based on the total oxygen amount, wherein the required reducing agent amount is increased with increase in the total oxygen amount, and perform a rich operation that controls the air-fuel ratio of exhaust gas to rich when trapped NOx in the second catalyst is to be released until an amount of supplied reducing agent due to the rich operation reaches the required reducing agent amount, and wherein the microprocessor is further programmed to compute a high speed component stored by a noble metal of the catalysts and a low speed component stored by an oxygen storage material of the catalysts separately, and to compute the total oxygen amount from the high speed component and the low speed component.

2. The exhaust gas purification device as defined in claim 1, wherein the microprocessor is further programmed to compute the total oxygen amount stored in the first catalyst and the second catalyst based on an engine operation condition, and wherein the rich operation is performed so that the amount of reducing agent in exhaust gas corresponds to the total oxygen amount.

3. The exhaust gas purification device as defined in claim 1, wherein the rich operation is performed so that the amount of reducing agent in exhaust gas is increased with increase in an amount of trapped NOx in the second catalyst.

4. The exhaust gas purification device as defined in claim 1, wherein the microprocessor is further programmed to compute the total oxygen amount stored in the first catalyst and the second catalyst based on an engine operation condition, and to compute an amount of trapped NOx in the second catalyst based on the engine operation condition, and wherein the rich operation is performed so that the amount of reducing agent in exhaust gas corresponds to the total oxygen amount and the amount of trapped NOx.

5. The exhaust gas purification device as defined in claim 1, wherein the microprocessor is further programmed to compute an oxygen amount in exhaust gas discharged from the engine, and to compute the total oxygen amount stored in the first catalyst and the second catalyst based on an oxygen storage rate and the oxygen amount in exhaust gas discharged from the engine, wherein the oxygen storage rate varies in accordance with the total oxygen amount stored in the first catalyst and the second catalyst.

6. The exhaust gas purification device as defined in claim 5, wherein the oxygen storage rate when the total oxygen amount is smaller than or equal to a predetermined value is larger than the oxygen storage rate when the total oxygen amount is greater than the predetermined value.

7. The exhaust gas purification device as defined in claim 1, wherein the microprocessor is further programmed to compute an excess oxygen amount in exhaust gas discharged from the engine, to compute a high speed component stored by a noble metal of the catalysts and a low speed component stored by an oxygen storage material of the catalysts, and to compute the total oxygen amount by adding the high speed component and the low speed component.

8. The exhaust gas purification device as defined in claim 1, wherein the high speed component has a precedence over the low speed component when the catalysts store oxygen in exhaust gas, and oxygen in exhaust gas is stored as the low speed component when the high speed component is saturated.

9. An exhaust gas purification device for an engine, comprising:

first catalyst means, installed in an exhaust passage, for storing and releasing oxygen in exhaust gas in accordance with an air-fuel ratio of exhaust gas;

second catalyst means, installed in the exhaust passage downstream of the first catalyst means, for trapping and releasing NOx in exhaust gas in accordance with the air-fuel ratio of exhaust gas; and rich operation means for:

computing a total oxygen amount stored in the first catalyst means and the second catalyst means, computing a required reducing agent amount based on the total oxygen amount, wherein the required reducing agent amount is increased with increase in the total oxygen amount, and controlling the air-fuel ratio of exhaust gas to rich when trapped NOx in the second catalyst means is to be released until an amount of supplied reducing agent due to the rich operation reaches the required reducing agent amount, and wherein the rich operation means is further for computing a high speed component stored by a noble metal of the catalyst means and a low speed component stored by an oxygen storage material of the catalyst means separately, and for computing the total oxygen amount from the high speed component and the low speed component.

10. The exhaust gas purification device as defined in claim 9, wherein the total oxygen amount stored in the first catalyst means and the second catalyst means is calculated based on an engine operation condition, and wherein the air-fuel ratio of exhaust gas is controlled so that the amount of reducing agent in exhaust gas corresponds to the total oxygen amount.

11. The exhaust gas purification device as defined in claim 10, wherein the rich operation means controls the air-fuel ratio of exhaust gas so that the amount of reducing agent in exhaust gas is increased with increase in an amount of trapped NOx in the second catalyst means.

12. The exhaust gas purification device as defined in claim 11, further comprising, means for computing an amount of trapped NOx in the second catalyst means based on an engine operation condition, and wherein the total oxygen amount stored in the first catalyst means and the second catalyst means is calculated based on the engine operation condition, and the rich operation means controls the air-fuel ratio of exhaust gas so that the amount of reducing agent in exhaust gas corresponds to the total oxygen amount and the amount of trapped NOx.

13. The exhaust gas purification device as defined in claim 12, further comprising, means for computing an oxygen amount in exhaust gas discharged from the engine, and wherein the total oxygen amount stored in the first catalyst means and the second catalyst means is calculated based on an oxygen storage rate and the oxygen amount in exhaust gas discharged from the engine, the oxygen storage rate varies in accordance with the total oxygen amount.

14. The exhaust gas purification device as defined in claim 13, wherein the oxygen storage rate when the total oxygen amount is smaller than or equal to a predetermined value is larger than the oxygen storage rate when the total oxygen amount is greater than the predetermined value.

15. A method for purifying exhaust gas discharged from an engine, comprising:
computing a total oxygen amount stored in a first catalyst and a second catalyst based on an engine operation condition, wherein the second catalyst is disposed downstream of the first catalyst;
computing a required reducing agent amount based on the total oxygen amount, wherein the required reducing agent amount is increased with increase in the total oxygen amount;
performing a rich operation that controls the air-fuel ratio of exhaust gas to rich when trapped NOx in the second catalyst is to be released until an amount of supplied reducing agent due to the rich operation reaches the required reducing agent amount; and
computing a high speed component stored by a noble metal of the catalysts and a low speed component stored by an oxygen storage material of the catalysts separately, and computing the total oxygen amount from the high speed component and the low speed component.

16. The method for purifying exhaust gas as defined in claim 15, wherein the rich operation is performed so that the amount of reducing agent in exhaust gas corresponds to the total oxygen amount.

17. The method for purifying exhaust gas as defined in claim 15, further computing an amount of trapped NOx in the second catalyst based on the engine operation condition, and wherein the rich operation is performed so that the amount of reducing agent in exhaust gas corresponds to a sum of the total oxygen amount and the amount of trapped NOx.

18. The method for purifying exhaust gas as defined in claim 15, further computing an oxygen amount in exhaust gas discharged from the engine, and computing the total oxygen amount stored in the first catalyst and the second catalyst based on an oxygen storage rate and the oxygen amount in exhaust gas discharged from the engine, wherein the oxygen storage rate varies in accordance with the total oxygen amount stored in the first catalyst and the second catalyst.

19. The method for purifying exhaust gas as defined in claim 18, wherein the oxygen storage rate when the total oxygen amount is smaller than or equal to a predetermined value is larger than the oxygen storage rate when the total oxygen amount is greater than the predetermined value.

20. An exhaust gas purification device for an engine, comprising:
an exhaust passage of the engine;
a first catalyst, installed in the exhaust passage, that stores and releases oxygen in exhaust gas in accordance with an air-fuel ratio of exhaust gas;
a second catalyst, installed in the exhaust passage downstream of the first catalyst, that traps and releases NOx in exhaust gas in accordance with the air-fuel ratio of exhaust gas; and
a microprocessor programmed to:
compute a total oxygen amount stored in the first catalyst and the second catalyst,
compute a required reducing agent amount based on the total oxygen amount, wherein the required reducing agent amount is increased with increase in the total oxygen amount, and
perform a rich operation that controls the air-fuel ratio of exhaust gas to rich when trapped NOx in the second catalyst is to be released until an amount of supplied reducing agent due to the rich operation reaches the required reducing agent amount,
wherein the microprocessor is further programmed to compute an oxygen amount in exhaust gas discharged from the engine, and to compute the total oxygen amount stored in the first catalyst and the second catalyst based on an oxygen storage rate and the oxygen amount in exhaust gas discharged from the engine,
wherein the oxygen storage rate varies in accordance with the total oxygen amount stored in the first catalyst and the second catalyst, wherein the oxygen storage rate when the total oxygen amount is smaller than or equal to a predetermined value is larger than the oxygen storage rate when the total oxygen amount is greater than the predetermined value.

21. An exhaust gas purification device for an engine, comprising:
an exhaust passage of the engine;
a first catalyst, installed in the exhaust passage, that stores and releases oxygen in exhaust gas in accordance with an air-fuel ratio of exhaust gas;
a second catalyst, installed in the exhaust passage downstream of the first catalyst, that traps and releases NOx in exhaust gas in accordance with the air-fuel ratio of exhaust gas; and
a microprocessor programmed to:
compute a total oxygen amount stored in the first catalyst and the second catalyst,
compute a required reducing agent amount based on the total oxygen amount, wherein the required reducing agent amount is increased with increase in the total oxygen amount, and
perform a rich operation that controls the air-fuel ratio of exhaust gas to rich when trapped NOx in the second catalyst is to be released until an amount of supplied reducing agent due to the rich operation reaches the required reducing agent amount,
wherein the microprocessor is further programmed to compute an excess oxygen amount in exhaust gas discharged from the engine, to compute a high speed component stored by a noble metal of the catalysts and a low speed component stored by an oxygen storage material of the catalysts, and to compute the total oxygen amount by adding the high speed component and the low speed component.

22. An exhaust gas purification device for an engine, comprising:

first catalyst means, installed in an exhaust passage, for storing and releasing oxygen in exhaust gas in accordance with an air-fuel ratio of exhaust gas;

second catalyst means, installed in the exhaust passage downstream of the first catalyst means, for trapping and releasing NOx in exhaust gas in accordance with the air-fuel ratio of exhaust gas; end rich operation means for:
  computing a total oxygen amount stored in the first catalyst means and the second catalyst means,
  computing a required reducing agent amount based on the total oxygen amount, wherein the required reducing agent amount is increased with increase in the total oxygen amount, and
  controlling the air-fuel ratio of exhaust gas to rich when trapped NOx in the second catalyst means is to be released until an amount of supplied reducing agent due to the rich operation reaches the required reducing agent amount,
  wherein the total oxygen amount stored in the first catalyst means and the second catalyst means is calculated based on an engine operation condition, and wherein the air-fuel ratio of exhaust gas is controlled so that the amount of reducing agent in exhaust gas corresponds to the total oxygen amount,
  wherein the rich operation means controls the air-fuel ratio of exhaust gas so that the amount of reducing agent in exhaust gas is increased with increase in an amount of trapped NOx in the second catalyst means;

means for computing an amount of trapped NOx in the second catalyst means based on an engine operation condition, and wherein the total oxygen amount stored in the first catalyst means and the second catalyst means is calculated based on the engine operation condition, and the rich operation means controls the air-fuel ratio of exhaust gas so that the amount of reducing agent in exhaust gas corresponds to the total oxygen amount and the amount of trapped NOx; and means for computing an oxygen amount in exhaust gas discharged from the engine, and wherein the total oxygen amount stored in the first catalyst means and the second catalyst means is calculated based on an oxygen storage rate and the oxygen amount in exhaust gas discharged from the engine, the oxygen storage rate varies in accordance with the total oxygen amount, wherein the oxygen storage rate when the total oxygen amount is smaller than or equal to a predetermined value is larger than the oxygen storage rate when the total oxygen amount is greater than the predetermined value.

23. A method for purifying exhaust gas discharged from an engine, comprising:

computing a total oxygen amount stored in a first catalyst and a second catalyst based on an engine operation condition, wherein the second catalyst is disposed downstream of the first catalyst;

computing a required reducing agent amount based on the total oxygen amount, wherein the required reducing agent amount is increased with increase in the total oxygen amount; and performing a rich operation that controls the air-fuel ratio of exhaust gas to rich when trapped NOx in the second catalyst is to be released until an amount of supplied reducing agent due to the rich operation reaches the required reducing agent amount, further computing an oxygen amount in exhaust gas discharged from the engine, and computing the total oxygen amount stored in the first catalyst and the second catalyst based on an oxygen storage rate and the oxygen amount in exhaust gas discharged from the engine, wherein the oxygen storage rate varies in accordance with the total oxygen amount stored in the first catalyst and the second catalyst, wherein the oxygen storage rate when the total oxygen amount is smaller than or equal to a predetermined value is larger than the oxygen storage rate when the total oxygen amount is greater than the predetermined value.

* * * * *